Sept. 2, 1969  R. V. HENDERSHOT  3,465,269
PHASE TIME VARIATOR
Filed Sept. 28, 1967  2 Sheets-Sheet 1
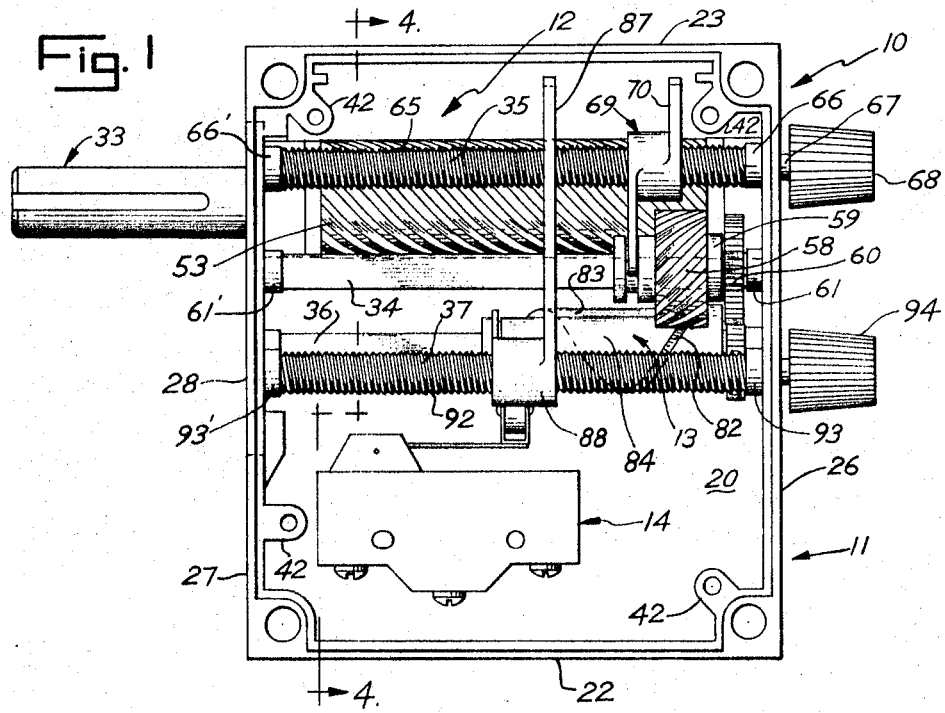
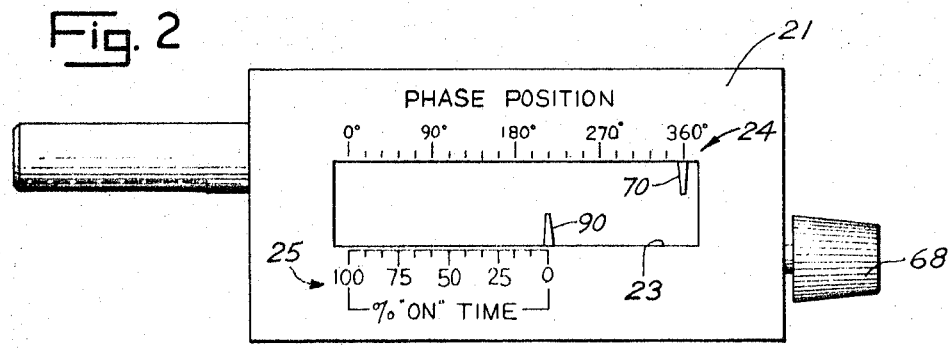
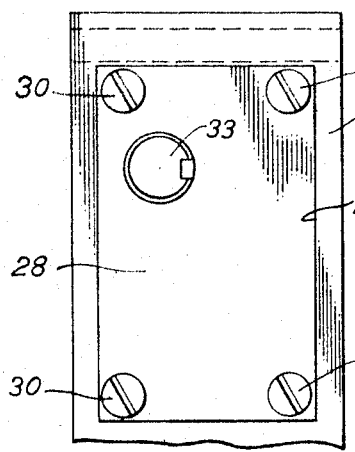
INVENTOR.
ROBERT V. HENDERSHOT
BY
Norton, Davis, Brewer & Brugman
ATTORNEYS Sept. 2, 1969         R. V. HENDERSHOT         3,465,269
PHASE TIME VARIATOR
Filed Sept. 28, 1967                                2 Sheets-Sheet 2
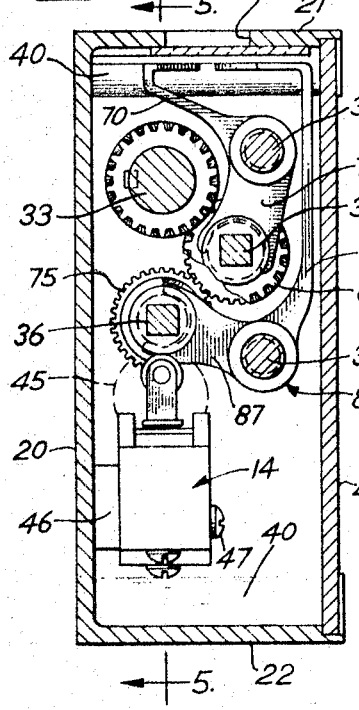
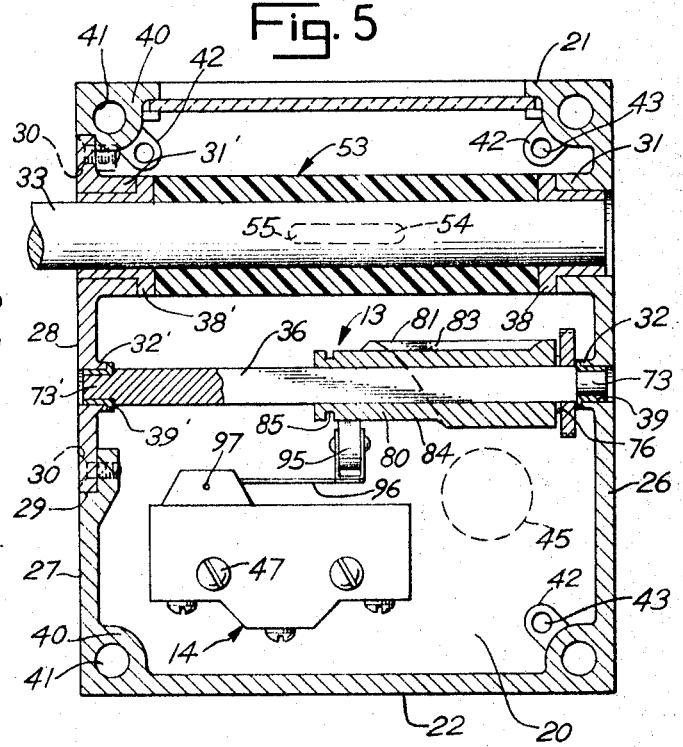
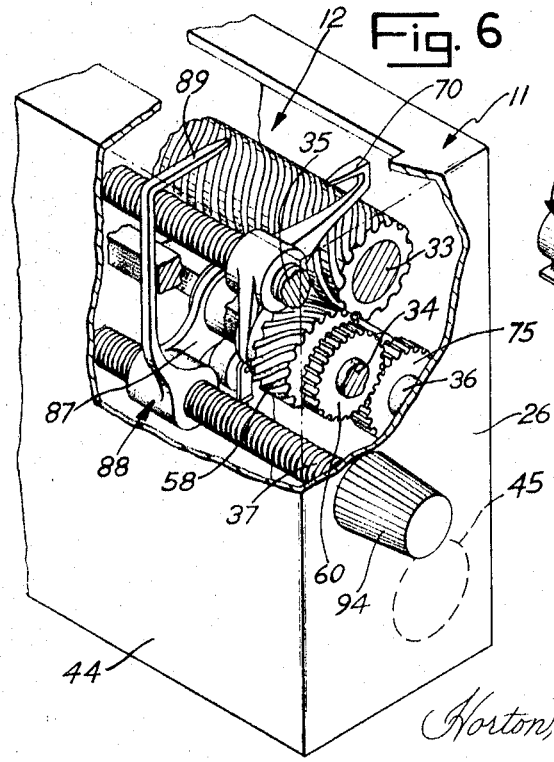
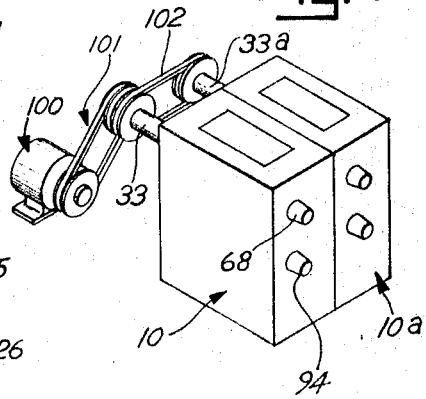
INVENTOR.
ROBERT V. HENDERSHOT
BY Horton, Davis, Brewer & Brugman
ATTORNEYS United States Patent Office 3,465,269
Patented Sept. 2, 1969

3,465,269
PHASE TIME VARIATOR
Robert V. Hendershot, Evanston, Ill., assignor to Candy Mfg. Co., Inc., Chicago, Ill., a corporation of Illinois
Filed Sept. 28, 1967, Ser. No. 671,332
Int. Cl. H01h 3/42
U.S. Cl. 335—69                                              8 Claims

ABSTRACT OF THE DISCLOSURE

A mechanical control device for regulating the operational cycle of electrical switches and related circuitry, both as to a duration of a given operating condition for a switch and as to the point in time at which such condition of operation is initiated.

---

Operational control of machines and mechanisms, and particularly certain subfunctions thereof is frequently relegated to timing switch devices capable of being energized or de-energized for selected periods. Heretofore, timing control for such switch devices has generally been of a preselected fixed order; one of the more simple expedients for this purpose utilizing a timing cam, constantly or variable driven, but of fixed profile engaged by a follower for operating a control switch. In other instances switch operation is controlled by highly sophisticated electronic circuitry usually including timing relays and similar means whereby desired switch "on" and "off" time, particularly as associated with various phases of a machine operation can be controlled.

For some time there has been need for improved means whereby electrical switch operation, in particular, may be effectively controlled both as to periods of "on" and "off" time as well as to the point or points in time at which such conditions are initiated and terminated. It is desired that such means be infinitely variable or adjustable in order to afford maximum range of utility to various switch control operations. Such a device for varying the operating characteristics of an electrical switch and related circuitry has obvious utility as in controlling operation of machines, electrical circuits, controllers for machines and in most instances where time variable capability of control is desired.

The present invention is directed to such improved means for infinitely varying "on" and "off" time of an electrical switch or switches and for infinitely varying or regulating the point in time in which selected operating conditions thereof occur. In brief, the present invention comprises a rotatively responsive gear means adapted to be coupled directly to a moving or a movable mechanism, so as to dynamically respond to an operating condition of a machine or mechanism to be controlled. The gear means in turn regulates and drives rotatable cam means and selectively variable means are provided for infinitely varying the phase relationship of the cam means with respect to the driving member for the gear means. Electrical switch means are operatively associated with the cam means for activation and deactivation in response to movements of a follower engageable with the cam means, and additional means are provided for infinitely varying the effective node portions of the cam means engageable by the cam follower whereby the time interval of engagement between cam node and follower is variably regulated. Thus switch means operated in conjunction with the improved means of this invention is infinitely variable as respect to "on" and "off" time as well as the point in time or operating cycle of a related mechanism at which such operating conditions occur.

An important object of this invention is to provide a new and improved device for varying electrical switch on and off time.

Another important object of this invention is to provide a new and improved device for regulating, in a generally infinitely variable fashion, the phase relation of a switch operator with respect to an operating mechanism and more particularly with respect to a constantly driven member of such mechanism.

Still another important object of this invention is to provide a new and improved means for infinitely varying time periods of switch activation and deactivation and for selectively varying the point in time at which such switch conditions occur.

Still another important object of this invention is to provide a new and improved phase time switch variator which is activated responsively to dynamic mechanisms and which is capable of infinite variation and change while such mechanism is in operation.

Having thus described the present invention, the above and further objects, features and advantages thereof, will appear to those familiar with the art from the following detailed description of a preferred embodiment thereof illustrated in the accompanying drawings and which represents the best mode presently contemplated for carrying out the concepts and features of this invention so as to enable those skilled in the art to practice the same.

FIGURE 1 is a side elevational view of a phase time variator device according to this invention, showing the housing thereof with cover removed to illustrate the general arrangement of elements therein;

FIGURE 2 is a top plan view of the device illustrated in FIG. 1;

FIGURE 3 is an enlarged partial elevational view of the left hand end of the device illustrated in FIG. 1;

FIGURE 4 is a cross-sectional view taken substantially along vantage lines 4—4 of FIG. 1 and looking in the direction of the arrows thereon;

FIGURE 5 is a cross-sectional view taken substantially along vantage lines 5—5 of FIG. 4 and looking in the direction of the arrows thereon;

FIGURE 6 is a partial perspective view of the device shown in FIGS. 1-5, illustrating the structural arrangement and operating relationship of elements combined therein; and FIGURE 7 is another perspective view of a modified arrangement showing two devices, of the order illustrated in FIG. 1, coupled in tandem for multiple switch control.

Turning now to the details of the preferred embodiment of this invention illustrated in the accompanying drawings, a phase variator device, indicated generally by numeral 10, is shown in FIG. 1 as comprising protective housing means 11 for enclosing and mounting regulating means 12, cam means 13, and switch means 14, the detailed description of which follows.

Housing means 11, as illustrated best in FIGS. 1 through 5 of the drawings, preferably comprises a unitary cast body of generally square or quadrangular configuration in front elevation and rectangular top plan as shown respectively in FIGS. 1 and 2. The unitary cast body is made up of planar rear panel or wall 20 formed integrally with a pair of parallel spaced and rectangular shaped top and bottom panels or walls 21, 22, respectively, with top panel 21 being distinguished by a generally centrally disposed elongated opening 23. Phase position scale means 24 are provided along one elongated margin of opening 23 and a shorter time scale means 25 is provided along the opposite margin thereof (see FIG. 2). The top and bottom wall panels 21 and 22 are interjoined with right-hand side panel 26 and a parallel spaced left-hand side panel 27 (see FIG. 1).

Left-hand side panel 27 is distinguished by a removable plate portion 28 which mounts over a conforming opening 29 therefor formed in panel 27. Plate 28 is held in mounted position by screw fasteners 30, 30 (see FIG. 3) located near its four corners and threaded into pads cast of the interior of the housing body.

The inside faces or surfaces of both the right-hand wall 26 and the removable plate 28 are formed with a plurality of interiorly extending cylindrical boss portions aligned in reigstering pairs on opposite sides of the interior of the housing means, such as boss pairs 31, 31′ and 32, 32′ shown in FIG. 5 of the drawings. In all there are five such sets or pairs of bearing bosses on the opposing faces of the side wall 26 and the removable end plate 28, which provide mounting support for five rotatable shaft members 33, 34, 35, 36 and 37 of the regulating means 12, as will be described more fully hereinafter. Briefly, however, it is to be noted that each of the shaft members is supported in bearing bushings carried by the respectively associated boss portions therefor, as exemplified by bearing bushings 38, 38′ and 39, 39′, illustrated in FIG. 5 of the drawings which rotatably support shaft members 33 and 36 respectively, as therein illustrated. In this regard it will be understood that the other shaft members 34, 35 and 37 are similarly supported at their ends in bearing bushings carried by pairs of opposing interior boss portions of the housing as above related.

Across each of the four interior corners of the housing body, as best shown in FIGS. 1 and 5 of the drawings, is a web portion 40 having an opening 41, receptive of bolts (not shown) for mounting the housing means to suitable support means. Four connector ears 42, 42 having threaded openings 43 are provided to receive removable fasteners (not shown) for mounting a cover plate 44 over the open front side of the housing body. This affords convenient means for inspection and repair of the working elements within the housing means.

It is to be noted that the openings 41 in the corner webs 40 extend all the way through the housing or that is, from front to back thereof. Thus, one or more of the devices according to this invention, may be aligned side-by-side or in tandem, and positively interconnected by long bolts passing through correspondingly aligned openings 41 of the adjacent housing means 11. Thus modified assembly is illustrated by units 10 and 10a shown in FIG. 7 of the drawings, for example.

It is also to be noted that the right-hand side wall 26 and the rear wall 20 of the housing means are each provided with convenience knock-out, such as 45 illustrated in FIGS. 5 and 6, respectively, to provide selectively available openings for suitable electrical conductors associated with switch means 14.

The rear wall or panel 20 of the housing is formed with an interiorly projecting integral mounting pad portion 46, adjacent the lower reaches thereof, for mounting switch means 14; mounting screws or bolts 47 passing through the switch means 14, into suitable threaded openings in mounting pad portion 46 in conventional fashion.

Turning now to the features of the regulating means 12, according to the illustrated preferred embodiment, such includes the several shaft means 33–36 heretofore mentioned which in turn operatively support certain mechanical elements of the regulating means, as will now be described.

As previously noted, shaft 33 is supported in bearing bushings 38, 38′ mounted in the bearing boss portions 31, 31′ of the housing whereby said shaft 33 is rotatable about its lengthwise extending axis. Shaft 33 constitutes the main drive input shaft to the variator device 10 and is normally coupled to some operating member of a given mechanism or machine to be controlled and preferably driven at a constant speed even though intermittently or periodically so as to provide a constant speed input for the device 10. By way of exemplary illustration, one schematic system for driving shaft 33 is set out in FIG. 7 wherein the same is coupled to a constant speed drive motor via sheave wheel and drive belt system as will be described in greater detail hereinafter. In any event, it is contemplated that shaft 33 will constitute the input shaft for the device 10 and preferably will be driven at constant r.p.m. Shaft 33 supports an elongated generally cylindrical worm 53 which is preferably made of nylon or similar plastic material having good wearability and capable of being molded whereby the worm 53 may be formed directly about the shaft 33 and interlocking key 54 mounted in a recessed keyway slot 55 formed intermediate the ends of the shaft 33. It is not essential, of course, to the success of the present invention that the gear 53 be molded in situ on shaft 33 or that the same be made of a plastic material, although such is preferred. If desired, worm 53 can be machined of brass or similar material and keyed to shaft 33 in a conventional fashion. It will be noted that shaft 33 is aligned generally parallel to and between the top and bottom walls of the housing 11 and extending lengthwise between the bushings 38, 38′ held by the right-hand side wall or panel 26 and the removable plate 28. Thus when the latter is mounted in position and held in place by the attaching screws 30, shaft 33 is axially locked between the bushings 38, 38′ for rotational movement. It will be recognized and appreciated that similar mounting is provided for the other shafts 34, 35 and 36, 37 making a most convenient system for mounting the shafts, productive of marked economies in assembly while providing a very effective means of protecting the working elements of the unit 10 within the enclosed interior of the housing means 11.

Mounted below and to one side of shaft 33, at approximately 4 o'clock relative thereto (see FIG. 4), is a worm gear shaft 34 having a polygonal (square, as herein illustrated) cross-section for the major portion of its length. Shaft 34 parallels shaft 33 and carries thereon a worm gear 58 (see FIGS. 1 and 6) in meshing engagement with the worm 53. Preferably, the tooth incline for both the worm 53 and worm gear 58 is 45° for relative axial movement as will appear presently. Like worm 53, worm gear 58 is preferably molded of nylon formed directly about a central hub 59 made of metal or a similar hard substance. Located immediately adjacent the right-hand end of the hub 59, as viewed in FIG. 1, is a spur gear 60 which is locked to the shaft 34, as by suitable key means, so as to rotate with that shaft. Spur gear 60 is further prevented from moving axially along the length of the shaft 34 (to the left in FIG. 1) by a conventional C-ring which snaps into an appropriate kerf or slot (not shown) cut for that purpose in the shaft intermediate the gear 60 and the adjacent end of hub 59, according to conventional practice.

As illustrated best in FIG. 1 of the drawings, shaft 34 is locked axially between the boss portions 61, 61′ which carry appropriate bushing members and which are formed on the inside walls of the right hand side wall 26 and a removable end plate 28, respectively, as previously mentioned. In order to permit rotation of shaft 34, the outer end portions thereof are appropriately cylindrically configured for rotational acceptance coaxially within bearing bushings carried by the hub portions 61, 61′. It will be recalled, however, that the major length of shaft 34 is a square cross-section which mates with the corresponding shaped opening formed coaxially of the hub member 59 to which the worm gear 58 is attached. Thus worm gear 58 and its hub 59 rotate with but also slide axially along shaft 34 as will be described hereinafter.

With reference particularly to FIGS. 1, 4 and 6 of the drawings, it will be seen that adjacently paralleling shafts 33 and 34, and located approximately at 2 o'clock position with respect to shaft 33 (as viewed in FIG. 4) is a phase adjuster shaft 35 having a lead screw thread 65 formed about its exterior and extending substantially the entire length thereof, except for cylindrical end portions which are carried in appropriate bushings mounted in bushing boss portions 66, 66' (see FIG. 1) in the manner of mounting shafts 33, 34 and 36 as above described. It is further to be noted that the right-hand end of shaft 35 is formed with a cylindrical extension of reduced diameter, indicated at 67 in FIG. 1, on which is mounted a control knob 68 exteriorily of housing means 11 and immediately adjacent right-hand side wall 26 thereof. A shifting yoke member 69 is threadingly mounted over the screw thread 65 of shaft 35 for movement therealong in response to rotational movement of that shaft as affected by manipulation of control knob 68. Yoke member 69 has a pointer arm portion 70 extending upwardly to cooperate with scale means 24, as illustrated best in FIG. 2 of the drawings. A shifting arm portion 71 (see FIGS. 1 and 4) extends downwardly to connectively embrace a slot or kerf formed inwardly of the circumferential limits of the hub member 59 carrying the worm gear 58, as best illustrated in FIGS. 1 and 6 of the drawings.

It will be immediately understood that with such an arrangement, threading movement of the shaft 35 causes the yoke member 69 to move along axially of shaft 35 and accordingly shift the worm gear 58 along its shaft 34. Thus manually operable means are provided for adjustably positioning the worm gear 58 along shaft 54 and relative to the worm 53, in accordance with manipulation of the control knob 68 and rotation of its associated adjuster shaft 35 as selected by the operator. If this function is contemplated, it will be recognized immediately by those skilled in the art that such lineal movement of the worm gear 58 along its shaft 34, while engaged with worm 53, produces a responsive rotation of the worm gear 58 relative to its driving worm 53. This activity, in turn, causes a responsive relative rotation of shaft 34 with respect to shaft 33 and accounts for a selected phase shifting of such parts relative to one another. Inasmuch as the spur gear 60 is attached to shaft 34, there is importantly a corresponding phase shifting of spur gear 60 as well.

Referring to FIG. 4 of the drawings for the moment, it will be appreciated that mounted directly below the drive shaft 33 and in spaced parallelism therewith, is a cam shaft 36 which, like the worm gear shaft 34, has a polygonal or square cross-sectional configuration substantially throughout its length; the ends 73, 73' of said shaft being appropriately cylindrically formed for reception in the cylindrical bores of bearing bushings carried by the boss projections or portions extending inwardly of the opposing faces of the side wall 26 and removable plate 28 as previously related (see projections 32, 32' and bushings 39, 39' illustrated in FIG. 5 of the drawings). Mounted on cam shaft 36 for axial sliding movement therealong is an elongated generally cylindrically configured cam means 13 which has a central axial opening of square or polygonal cross-section to matingly fit or engage the exterior of the major portion of shaft 36.

A spur gear 75 is mounted on the right-hand end of shaft 36, between the cam means 13 and bushing 39 and in mating engagement with spur gear 60; such two gears being in a 1:1 ratio as herein illustrated. Gear 75, like gear 60, is locked to its shaft for rotation therewith by suitable key means for example, and is fixed axially between the bushing 39 and a C snap ring 76 in assembly. Thus the cam shaft 36 is rotated in response to the movements of gear 60 and its shaft 34. As a consequence, the rotational phase shifting of shaft 34 with respect to input shaft 33, as above described, is transmitted to the cam shaft 36 and cam means 13.

As best illustrated in FIG. 5 of the drawings, cam means 13 is formed as a generally cylindrical member having a cylindrical body portion 80 provided with an elongated raised node or land portion 81 formed integrally with body portion 80. Land portion 81 projects outwardly of the circumference of body portion 80 with its exterior defining a cylindrical segment providing a raised camming surface; the lesser diametered exterior surface of body portion 80 also constituting a cylindrical segment forming a depressed camming surface. The raised cam surface of portion 81 is uniform in diameter and triangular in shape. If represented in a developed plane, portion 81 would appear as a right triangular surface, the base of which is located uninterruptedly and continuously about the right-hand end of the cam means 13 and the hypotenuse of which comprises an elongated riser 82 extending spirally around the cylindrical body portion 80. The leg of such triangular surface also constitutes a linear riser, indicated at 83 in FIG. 5 of the drawings, which extends generally parallel to the lengthwise axis of cam means 13. In a similar fashion, the cylindrical exterior of body portion 80 not occupied by raised land portion 81, constitutes a depressed cam surface 84, bounded by the two riser portions 82 and 83 and the left-hand end of the cam means as seen in FIGS. 1 and 5. In general, it may be stated that cam means 13 constitutes a more or less cylindrical member having a spiral riser extending between a depressed cylindrical surface segment and a raised cylindrical surface segment thereof with such surface segments if developed in a plane, being configured generally as triangles.

Near the left-hand end of the cylindrical body portion 80 of cam means 13, as viewed best in FIG. 5 of the drawings, a cylindrical kerf or groove 85 is provided to cooperate with the outer ends of bifurcated arm portion 87 of a shifting yoke member 88. The latter is mounted on adjuster shaft 37 and comprises a pointer arm portion 89 which cooperates with the time scale means 25 bordering one margin of opening 23 in housing means 11 as previously described (see FIGS. 2 and 4). The arm portion 87 embraces the slot or kerf 85 in the cam means 13 and couples the same to the shifting yoke member whereby the cam means may be shifted axially along its shaft 36.

As will best be understood from FIGS. 1 and 6 of the drawings, adjusted shaft means 37 is substantially identical to the previously described adjuster shaft 35; the same having an exterior screw thread 92 and reduced cylindrical end portions (not shown) carried in suitable bearing bushings housed in projections 93, 93' (FIG. 1) extending interiorly of the opposed side walls of housing means 11. The right-hand end of the shaft means 37 as illustrated in FIG. 1 extends through the right-hand side wall 26 of the housing means and mounts a control knob 94 by which shaft 37 may be manually rotated to threadingly shift the yoke member 88 therealong. It will be recognized that shifting of the yoke member produces responsive linear displacement of the cam means 13 along its shaft 36. This effectively presents a selectively varied portion of the raised and depressed cam surfaces to a stationarily positioned cam follower roller 95 associated with switch means 14.

Switch means 14, as best illustrated in FIGS. 1 and 5 of the drawings, includes a pivotally mounted switch actuator arm 96, the outer end of which rotatably supports the cam follower roller means 95. The opposite end of arm 96 is pivotally supported on pivot pin 97; the pivotal actuation of such arm downwardly from its FIG. 5 position normally serving to close switch contacts and initiate energization of switch means 14.

It will be immediately appreciated that rotatable adjustment of the adjuster knob 94 and attendant rotation of its related shaft 37, causes corresponding axial shifting of the cam means 13 with respect to the stationary cam following roller 95 thereby effectively altering the extent of the raised land surface 81 engaged by the roller means. Thus, considering the switch arm position to be initiated by depression of the actuating arm 95 from its FIGS. 1 and 5 positions, the duration of switch "on" time can be regulated or variably adjusted according to the axial positioning of the cam means 13 along shaft 36. This function of axially shifting the cam means 13 is reflected on scale means 25 as percent of switch "on" time. It will be noted, for example, that in the position of the roller means 95 and cam means 13, shown in FIG. 5, the roller means is engaged with an uninterrupted end portion of the uniform cylindrical exterior surface of the cylindrical body portion 80 for the cam means. Thus the percent of "on" time at that relative position between cam and cam follower is zero, as reflected on the scale means 25 and the related pointer arm 89 (see FIG. 2). Conversely, shifting of the cam means to the left, as viewed in FIGS. 1 and 5, so that the roller 95 is in engagement with the uninterrupted raised cylindrical surface of portion 81 at the right-hand end of the cam means, producing 100% switch "on" time. It is obvious, of course, that reverse actuated condition of the switch means can be obtained by providing a switch means in which the depression of the cam follower arm 96 produces switch off operation instead of a switch on condition as described.

The regulatable or adjustable switch "on" time as immediately above noted, is effectively coupled in the variator means 10 according to this invention, to the described function of phase shifting the cam means 13 with respect to the rotational movement of the input or drive shaft means 33. Basically, this comes about by the axial shifting of the worm gear 58 along its shaft means 34, in response to manual rotation of the adjuster shaft means 35, by turning of control knob 68. As previously explained, axial movement of the worm gear relative to its driving worm 53 causes a responsively related relative rotation between shafts 34 and 33 to correspondingly rotate spur gear 60 which is coupled to gear 75. As a result, the secondary spur gear 75 rotatably drives the cam shaft 36 and causes responsive rotation and phase shifting of cam means 13 therewith. By this expedient the point in time at which either of the riser portions 82 or 83 of the raised cam surfaces is presented to the cam follower roller means may be accordingly advanced or retarded. In other words the cam is phase shifted to alter switch operation except, of course, for such relative positions of cam follower and cam means 13 as illustrated in FIG. 5, whereat the cam means engages a continuous uninterrupted surface, or that is, fails to pivotally actuate the arm means 96 in response to rotational movement of the cam means.

From the foregoing description it will be appreciated that the embodiment of the improved phase time variator hereinabove described provides an effective means for controlling operation of an electrical switch means, both as to the point in time which a switch may be activated or de-activated in regard to a source of fixed cycle of motion applied to input shaft means 33. Such also provides an effective means for adjustably varying the duration of a given operating condition for the switch means, such as the percent "on" or "off" time, according to the axial position of the cam means relative to its stationary follower. Thus these two important objectives of this invention are accomplished.

Turning now to the schematically represented modification of the present invention, set forth in FIG. 7 of the drawings, it will be appreciated that a phase variator device 10 as hereinabove described is therein shown coupled in tandem side-by-side relation with a similar and corresponding phase variator unit 10a; the two housing means thereof preferably being interconnected by connector bolts passing through the mounting openings 42 of the housing means. A suitable source of driving motion, such as electrical motor means 100, is coupled to the input shaft 33 of the unit 10 as by sheave wheel and belt drive means 101. The second unit 10a is correspondingly driven by a secondary drive belt and sheave wheel means 102 between input shafts 33 of unit 10 and input shaft 33a. Thus, as shown, the two input shafts 33 and 33a are driven at like speeds of rotation. Consequently, the two switch means associated with the two units 10 and 10a, will similarly respond to the operation of the variators in accordance with like manipulation and adjustment of the control knobs 68 and 94 as previously explained. It will be understood, however, that unit 10a and its switch means may be regulated to effect the same or a different cycle of events as to time and phase relationship with respect to the driving source 105 as that effected by unit 10. Normally speaking, such tandem arrangement is useful primarily for bringing about different selected conditions of switch operation from the two units. Further, it will be understood that while two units are shown coupled in tandem, the same principles apply to any number of such units, thereby affording a remarkable degree of flexibility and variation in control according to the present invention.

Having thus described the present invention as it occurs in the preferred embodiment thereof appearing in the accompanying drawings, those familiar with the art will readily appreciate and recognize that the same is subject to various modifications, changes and substitutions of equivalents without materially departing from the spirit and scope of its inventive concepts. Consequently, it is intended that the present invention be unlimited by the foregoing descriptive materials, except as may appear in the following appended claims.

I claim:

1. In combination: elongated cam means rotatable about its legnthwise axis and having a raised circumferential surface segment and a depressed circumferential surface segment, each extending substantially lengthwise of said cam means and partially about the exterior thereof, with the peripheral extent of each said segment varying from maximum to minimum between its ends; cam follower means positioned adjacent said cam means for engaging said surface segments, drive means for constantly rotatably driving said cam means, first selectively operable means for shifting said cam means axially relative to said follower means whereby the peripheral extent of each said surface segment disposed opposite said follower means for engagement thereby may be selectively varied, and second selectively operable means for rotatably shifting said cam means relative to said drive means and said follower means whereby the point in each cycle of rotation for said cam means at which said follower means transits between said segments opposite thereto may be selectively varied; said first and second selectively operable means each being operable without interrupting the rotational driving of said cam means.

2. The combination as set forth in claim 1 wherein each said means for shifting said cam means is manually operable independently of the other.

3. The combination of claim 1 and electrical switch means having actuator means responsive to movement of said follower means whereby for a given rotational cycle of said cam means the duration of a selected operating condition for said switch means may be regulated selectively and the point in said cycle at which said switch condition is initiated may be adjustable selected.

4. The combination in claim 1 wherein said raised surface segment is at a uniform radial distance from the rotational axis of said cam means and said depressed surface segment is at a lesser uniform radial distance therefrom.

5. The combination of claim 1 wherein said raised and depressed surface segments are separated by riser portions extending therebetween and substantially along the length of said cam means; said cam means having a uniform cylindrical circumference at one end thereof and a different uniform cylindrical circumference at the opposite end thereof.

6. A phase time variator comprising: housing means, drive shaft means rotatably supported in said housing means and having one end thereof extending outwardly of said housing means for connection to a source of driving motion for rotatably driving said drive shaft means at constant speed, cam shaft means mounted within said housing means, parallel to said drive shaft means, generally cylindrical cam means mounted on said cam shaft means for axial movement therealong and for rotation therewith, said cam means having a raised cylindrical surface segment and a depressed cylindrical surface segment, each of which segments extends substantially along the length of said cam means over a non-uniform circumferential portion thereof; a worm mounted on said drive shaft means for rotation therewith, worm gear means mounted in meshing engagement with said worm and supported on a rotatable worm gear shaft paralleling said drive shaft means, said worm gear means being movable axially along said worm gear shaft and rotatable therewith; rotatable first adjuster shaft means adjacent said worm and worm gear means having manually engageable means exteriorly of said housing means, yoke means carried by said adjuster shaft means and movable therealong in response to manual rotation thereof, said yoke means having an arm portion engageable with said worm gear means for moving the latter axially along said worm gear shaft and relative to said worm, thereby to effect relative rotation between said worm and worm gear means and their respective shafts; drive gear means coupling said cam shaft means to said worm gear shaft whereby rotation of the latter effects rotation of said cam shaft means, both with and relative to said to said drive shaft means; rotatable second adjuster shaft means adjacent said cam means having manually engageable means exteriorly of said housing means, second yoke means mounted on and movable axially along said second adjuster shaft means in response to manual rotation thereof and having a portion engageable with said cam means for moving the latter axially along said cam shaft means; and cam follower means adjacent said cam means for engaging said surface segments thereon, the portions of said raised and depressed surface segments presented for engagement by said follower means being selectively determined in accordance with the axial positioning of said cam means on said cam shaft means and the point in a given cycle of rotation for said cam means at which said follower means moves between said raised and depressed surface segments being selectively variable in accordance with the rotational adjustment of said cam means relative to said drive shaft means.

7. The combination of claim 6 and switch means having an actuator means responsive to movements of said follower means whereby the duration of a given actuated condition for said switch means may be selectively varied in accordance with the circumferential extent of said surface segments engaged by said follower means and the point of initiation for said given condition may be selectively varied in accordance with the relative rotational adjustment of said cam means.

8. The combination of claim 7 including scale means on said housing means, and pointer means on said first and second yoke means operably associated with said scale means thereby to visually indicate the duration and point of initiation of said actuated condition in an operating cycle for said switch means.

References Cited

UNITED STATES PATENTS

| | | | |
|---|---|---|---|
| 2,790,863 | 4/1957 | Towle | 200—153.12 |
| 2,563,304 | 8/1951 | Bjork. | |
| 2,073,417 | 3/1937 | Fox et al. | |

BERNARD A. GILHEANY, Primary Examiner

D. M. MORGAN, Assistant Examiner

U.S. Cl. X.R.

200—38